US008429887B2

(12) United States Patent　　(10) Patent No.: US 8,429,887 B2
Sadler　　(45) Date of Patent: Apr. 30, 2013

(54) YARD WASTE COLLECTION SYSTEM, COLLECTION APPARATUS, AND METHOD FOR COLLECTING YARD WASTE

(76) Inventor: Alan E. Sadler, Sterling, MA (US)

( * ) Notice: Subject to any disclaimer, the term of this patent is extended or adjusted under 35 U.S.C. 154(b) by 0 days.

(21) Appl. No.: 12/534,484

(22) Filed: Aug. 3, 2009

(65) Prior Publication Data

US 2011/0023434 A1　　Feb. 3, 2011

(51) Int. Cl.
*A01D 43/06*　　(2006.01)
(52) U.S. Cl.
USPC .................................................................. 56/202
(58) Field of Classification Search ............ 56/202–206, 56/5, 13.3, 16.6
See application file for complete search history.

(56) References Cited

U.S. PATENT DOCUMENTS

| | | | | |
|---|---|---|---|---|
| 763,142 | A * | 6/1904 | Bisler | 229/125.22 |
| 865,331 | A * | 9/1907 | Coldwell | 56/202 |
| 1,999,102 | A | 4/1935 | Kirby | |
| 3,135,080 | A * | 6/1964 | Christiansen | 56/15.3 |
| 3,191,370 | A | 6/1965 | Epstein | |
| 3,494,116 | A | 2/1970 | Lempke | |
| 3,624,697 | A * | 11/1971 | Fuller | 56/16.6 |
| 3,813,725 | A | 6/1974 | Rinker | |
| 3,881,304 | A | 5/1975 | Lempke | |
| 3,934,392 | A | 1/1976 | Moery et al. | |
| 4,015,406 | A * | 4/1977 | Witt et al. | 56/202 |
| 4,095,398 | A | 6/1978 | Aumann et al. | |
| 4,158,279 | A | 6/1979 | Jackson | |
| 4,377,063 | A * | 3/1983 | Leaphart | 56/202 |
| 4,522,019 | A * | 6/1985 | Edwards et al. | 56/202 |
| 4,598,536 | A | 7/1986 | Langley | |
| 4,699,393 | A | 10/1987 | Schweigert | |
| 4,738,088 | A * | 4/1988 | Klever et al. | 56/202 |
| 4,791,779 | A | 12/1988 | Hoffman | |
| 4,893,746 | A * | 1/1990 | Swanhart et al. | 229/122 |
| 5,031,277 | A | 7/1991 | Coker | |
| 5,243,809 | A | 9/1993 | Redding | |
| 6,029,312 | A | 2/2000 | Whitney | |
| 6,595,737 | B1 * | 7/2003 | Parish | 414/519 |
| 2005/0055994 | A1 | 3/2005 | Hebbard et al. | |

OTHER PUBLICATIONS

Communication and European Search Report issued Dec. 27, 2010 in European Application No. 10251385.0.

* cited by examiner

*Primary Examiner* — Alicia Torres
(74) *Attorney, Agent, or Firm* — Edwards Wildman Palmer LLP; Steven M. Jensen (57) ABSTRACT

Systems and methods for collecting yard waste, and a collection apparatus for receiving the yard waste, are provided. A yard waste collection system for connection with a tractor, the system which optimizes air flow comprising a collection apparatus including a cage suspension frame, a plurality of collapsible portions, and at least a rigid bottom portion, the rigid bottom portion having a drop door that opens and closes relative to the cage suspension frame to allow access to an interior space of the collection apparatus; a cage suspension frame operably connected to the tractor, the collection apparatus being pivotably suspended from the cage suspension frame; and a conduit for allowing passage of yard waste ejected from the tractor to the interior space of the collection apparatus.

20 Claims, 12 Drawing Sheets

YARD WASTE COLLECTION SYSTEM, COLLECTION APPARATUS, AND METHOD FOR COLLECTING YARD WASTE

FIELD OF THE INVENTION

The subject invention relates to systems and methods for collecting yard waste such as leaves, cut grass, and other debris, and a collection apparatus configured to receive the yard waste and to empty the yard waste in an efficient manner.

BACKGROUND OF THE INVENTION

Typical grass collection apparatuses are provided as attachments to lawn tractors, or as dedicated components of lawn tractors; other detachable devices often require a vacuum or blower to move leaves and yard waste into a bag or container. However, the use of a motorized leaf collection component, in combination with a motorized lawn tractor or lawnmower, can increase the initial cost and subsequent operation and maintenance costs of the leaf collection apparatus, as well as restrict its maneuverability.

Further, conventional leaf and debris collection apparatuses often utilize a rigid container that may be heavy and/or difficult to detach from the tractor, or a collapsible pouch-like container that does not provide sufficient support when partially or completely filled with debris, thus making the collection apparatus difficult to handle. Also, collection apparatuses designed primarily for grass collection tend to fill rapidly when used to collect leaves and thus require inefficient and frequent emptying.

SUMMARY OF THE INVENTION

Systems and methods for collecting yard waste, including leaves, cut grass, and other debris, and a collection apparatus for receiving and disposing of the yard waste, are provided. In particular, the collection apparatus preferably is rigid and stable during collection so as to withstand the weight and increased volume of leaves and other debris. The collection apparatus also should be permeable to air and particulate debris so as to allow dense packing of the leaves and debris collected. Further, the collection apparatus preferably includes at least side doors and a bottom drop door for emptying the contents of the collection apparatus, thus enabling easy handling and disposal of yard waste and potentially preventing back injuries. Additionally, the collection apparatus preferably is made of a mesh material of sufficient strength and rigidity to receive leaves and other debris during use, but that is collapsible for easy storage and/or shipment.

According to the subject invention, a collector for collecting debris from a lawn tractor or grass mower preferably includes a collection apparatus including a frame, a plurality of collapsible portions, and at least a rigid bottom portion, the rigid bottom portion having a drop door that opens and closes relative to the frame to allow access to an interior space of the collection apparatus; a cage suspension frame operably connected to the tractor, the collection apparatus being pivotably suspended from the cage suspension frame; and a conduit for allowing passage of yard waste ejected from the tractor to the interior space of the collection apparatus.

Further, the collector is provided with a frame couple for pivotably suspending the collector from a mounting frame that is secured on the lawn tractor, and a mounting base on top of which a cage suspension frame is removably disposed. The cage suspension frame is easily removed for storage and thus allowing the tractor to be used for other purposes without a time-consuming disassembly process.

A method of adapting a waste collection system to a tractor can include: providing a mounting frame to an existing mounting portion of the tractor; pivotably suspending a collection apparatus including a frame, a plurality of collapsible portions, and at least a rigid bottom portion, the rigid bottom portion having a drop door that opens and closes relative to the frame to allow access to an interior space of the collection apparatus; and providing a conduit for allowing passage of yard waste ejected from the tractor to the interior space of the collection apparatus.

A collector for collecting debris from a grass mower can include: a rigid top portion comprising a frame enclosed in permeable and substantially impermeable portions; a rigid bottom portion; and collapsible side portions including an operator-facing side portion including a top substantially impermeable portion and a bottom permeable portion, a first substantially permeable side portion including a door, and a second and third substantially permeable side portions, where the collector further includes a conduit for allowing passage of ejected debris from an ejection opening of the grass mower to an interior space of the collector.

BRIEF DESCRIPTION OF THE DRAWINGS

For a fuller understanding of the nature and desired objects of the subject invention, reference is made to the following detailed description taken in conjunction with the accompanying drawing figures wherein like reference character denote corresponding parts throughout the several views and wherein:

FIGS. 2A to 2E depict the leaf collection apparatus of FIGS. 1A-1C, where FIG. 2A depicts the leaf collection apparatus in its collapsed state, FIG. 2B depicts the leaf collection apparatus with unfastened straps, FIG. 2C depicts the leaf collection apparatus in a partially expanded state, FIG. 2E depicts the leaf collection apparatus in the fully expanded state with fastened straps.

DETAILED DESCRIPTION OF THE INVENTION

A leaf collection apparatus for use in systems and methods for collecting yard waste is provided for collecting yard waste such as leaves, cut grass, and other debris ejected from a lawn tractor. As used herein, the term "lawn tractor" refers to any commercially available vehicle, including but not limited to lawn tractors, lawnmowers, and other motorized equipment, and encompasses a riding mower. The leaf collection apparatus is arranged to permit emptying of the debris from the leaf collection apparatus with minimum physical exertion by the operator. Also, the leaf collection apparatus preferably includes a substantially collapsible assembly that enables easy storage, and which can be shipped with reduced space requirements, as compared to non-collapsible components. The apparatus further eliminates the need for an additional motorized device.

The leaf collection apparatus preferably includes an opening configured to mate with ejection openings and/or tubes of commercially available lawn tractors. The leaf collection apparatus can use the vacuum force passively generated by the riding grass mower to move debris such as cut grass, leaves, and other yard waste into the collection apparatus. The leaf collection apparatus preferably includes collapsible portions that are substantially impermeable to ejected particulates, such as dust particles, on at least a portion that faces the seated operator. The leaf collection apparatus further includes air and particulate permeable portions that allow air and particulates to escape the leaf collection apparatus, creating needed airflow and thus permitting a more dense packing of debris and yard waste. Air flow through the apparatus is critical to the movement of debris through the apparatus and the avoidance of chute blockage because leaves, especially when dry, are lighter in weight per square inch and require greater air movement for collection. This is the reason why apparatuses designed primarily for the collection of grass tend to fill rapidly and clog frequently.

Figure 1A:
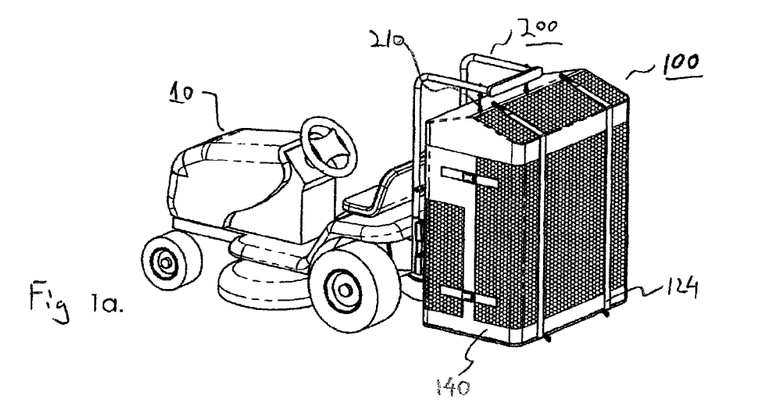
FIGS. 1A to 1C depict a leaf collection apparatus assembled on a cage suspension frame and connected to a riding tractor, where vertical doors of the leaf collection apparatus are fully closed in FIG. 1A, the vertical doors are in a partially opened state in FIG. 1B, and a drop door is depicted in a partially opened state in FIG. 1C.

FIG. 1A depicts a leaf collection apparatus 100 assembled on a riding tractor. The leaf collection apparatus 100 preferably is suspended from a cage suspension frame 200 by one or more frame couples 210. The frame couples 210 may constitute one or more latches and/or hoops that pivotably connect the cage suspension frame 200 and the leaf collection apparatus 100. As a result of this arrangement, the leaf collection apparatus 100 is pivotable on the cage suspension frame 200, thus enabling an operator to appropriately position the leaf collection apparatus 100 for emptying and storage, as described herein.

Figure 1B:
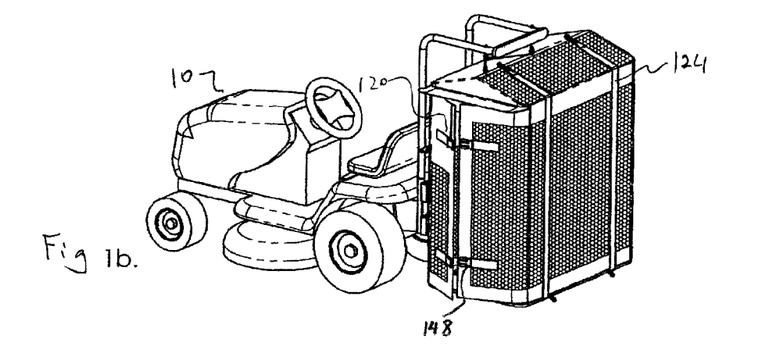
Figure 1C:
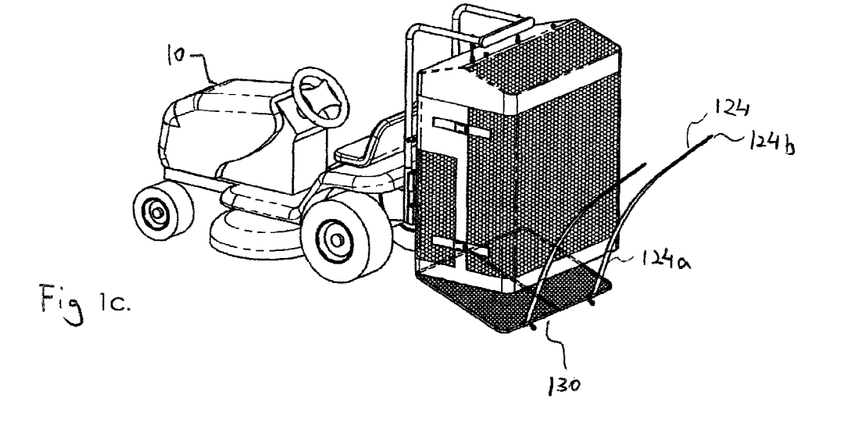

FIG. 1B depicts the leaf collection apparatus 100 with a pair of vertical doors 140, which are shown in a partially opened state. As described herein, the leaf collection apparatus 100 preferably includes at least one set of side doors (i.e., the vertical doors 140) provided on the leaf collection apparatus 100. The vertical doors 140 are provided on a side portion of the leaf collection apparatus 100 and preferably open outwardly from the leaf collection apparatus 100. The vertical doors 140 can be provided with one or more fasteners 148 for opening and closing the vertical doors 140, preferably at least two fasteners as shown in FIGS. 1A-1C. Suitable fasteners can include a snap buckle and two ribbons for attaching male and female ends of the snap buckle on the side portion of the vertical doors 140. Vertical doors 140 are preferably designed with removable slats that provide for dimensional stability and then are easily removed for storage of the collection cage. The leaf collection apparatus 100 preferably is provided with an additional door located on the bottom of the leaf collection apparatus 100, where the additional door is referred to herein as a "drop door" 130.

FIG. 1C depicts the leaf collection apparatus 100 with the drop door 130 in a partially opened state. As further described below, the drop door 130 preferably is provided on a rigid bottom portion of the leaf collection apparatus 100. The drop door 130 preferably occupies substantially an entire bottom surface of the leaf collection apparatus 100 to facilitate easy disposal of debris, but optionally may extend over only a limited portion of the bottom surface. The drop door 130 can be connected to the leaf collection apparatus 100 by use of a pair of fastening straps (or "fasteners") 124. Each of the fasteners 124 preferably includes at least a strap 124a attached to the drop door 130 at a first end, and an anchor 124b provided at a second end of the fastener 124 for removably connecting the fastener 124 to a top surface ("spine") of the leaf collection apparatus 100 (see FIG. 1A).

The vertical side doors 140 and the drop door 130 provide two different methods for emptying the contents (debris, leaves, yard waste, etc.) of the leaf collection apparatus 100. According to a first method, the frame couples 210 provided on the cage suspension frame 200 enable pivoting (by lifting the opposite end) of the leaf collection apparatus 100 due to the free movement of the coupling anchors disposed on the cage suspension frame. The contents of the leaf collection apparatus 100 can then be emptied through the opened vertical doors 140. As a result, it is possible to empty the leaf collection apparatus 100, while reducing the amount of force and energy required to lift the leaf collection apparatus 100, and thus remove any contents substantially without lifting the leaf collection apparatus 100. This results, in part, because a greater portion of the collected waste resides in that portion of the collection apparatus 100 that is farthest from the feed tube insert, a direct result of the positive airflow provided by the apparatus. According to a second method for emptying the leaf collection apparatus 100, the drop door 130 may be opened by releasing the fasteners 124. According to this method, the contents of the leaf collection apparatus 100 can be emptied by the force of gravity.

Figure 2A:
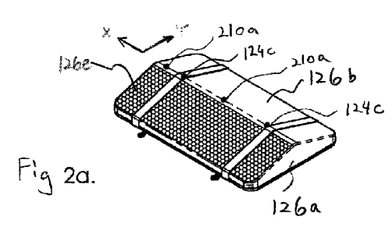
Figure 2B:
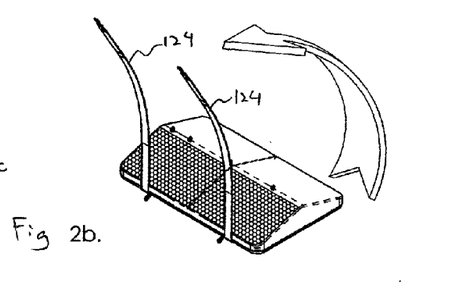

FIG. 2A depicts the leaf collection apparatus 100 in its collapsed state. The leaf collection apparatus 100 includes a number of collapsible portions and rigid portions. When collapsed, the leaf collection apparatus 100 occupies a reduced space as depicted in FIG. 2A. As shown in FIG. 2A, the leaf collection apparatus 100 preferably includes a rigid top portion 126. The rigid top portion 126 preferably is formed by enclosing a rigid frame with substantially impermeable side portions 126a, a substantially impermeable top panel portion 126b, and a permeable mesh top portion 126e. The substantially impermeable top portion 126b can be joined with the permeable mesh top portion 126e along a ridge (spine) formed at the top of the leaf collection apparatus 100. The ridge can be reinforced with a rigid member (not shown) of the rigid frame. The rigid top portion 126 includes at least two coupling anchors 210a for coupling with the suspension frame couples 210, respectively, to suspend the leaf collection apparatus 100 from the cage suspension frame 200. The rigid top portion (spine) 126 also includes two fastening anchors 124c for coupling with the strap fasteners 124 when the leaf collection apparatus is fully expanded, in order to keep the drop door 130 closed. FIG. 2B depicts a collapsed leaf collection apparatus 100 with released fasteners 124.

Figure 2C:
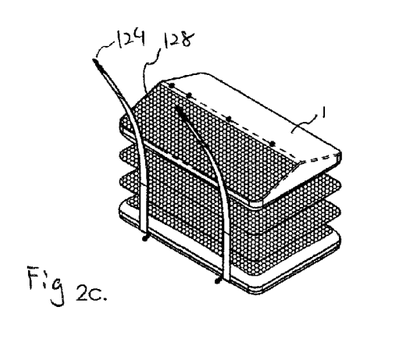
Figure 2D:
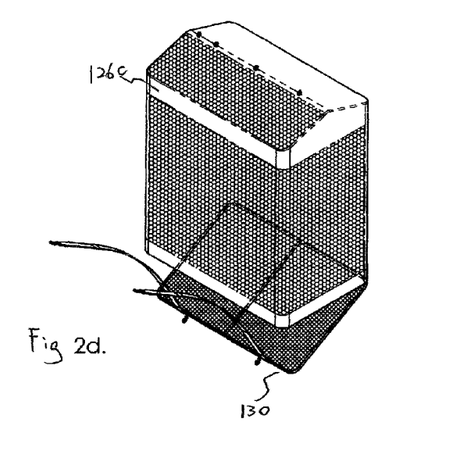
FIG. 2D depicts the leaf collection apparatus in a fully expanded state with a partially opened drop door.

FIGS. 2C and 2D depict the leaf collection apparatus 100 in the process of being expanded, and in particular, depict a plurality of permeable mesh portions. The mesh used in the mesh portions can be made from a nylon hex-mesh having a mesh opening in the range of about 3 mm to about 24 mm, although other sizes and materials other than nylon can be used. The mesh opening may be square, round, triangular, hexagonal, or any other suitable shape. For example, the nylon hex-mesh can be a 6 mm nylon hex-mesh. Suitable materials include, but are not limited to: nylon, rayon, cotton, or any blends thereof. Preferably the selected material is moisture and abrasion resistant.

Figure 2E:
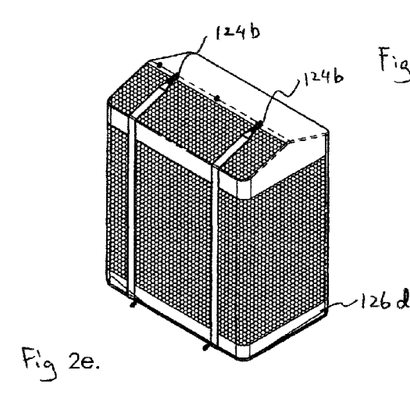

Referring to FIG. 2C, the leaf collection apparatus 100 is in a partially expanded state, and in FIG. 2D, the leaf collection apparatus 100 is in a fully expanded state. As shown, the leaf collection apparatus 100 includes collapsible and permeable portions that are preferably formed with a flexible mesh material, with the exception of a side portion facing the operator of the riding mower. The side portion facing the operator preferably includes a combination of a substantially impermeable portion at its top, thus protecting the operator, a collapsible mesh portion on its bottom. FIG. 2D also depicts the drop door 130 in a partially opened state. The drop door 130 preferably is formed with a rigid frame 130a. The rigid frame 130a, when the drop door is fastened to the rigid top portion 126, can support the weight of the debris and prevents a sagging type of deformation on the bottom of the leaf collection apparatus. FIG. 2E depicts the leaf collection apparatus 100 in a fully expanded state with the fasteners 124 connected to corresponding anchors 124b to maintain the drop door 130 closed.

Figure 3A:
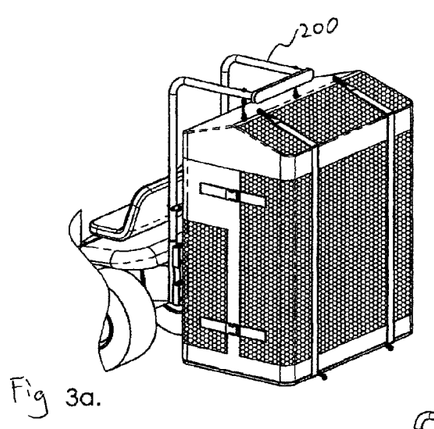
FIGS. 3A to 3C depict a sequence for opening the vertical side doors of the leaf collection apparatus of FIGS. 1A-1C.
Figure 3B:
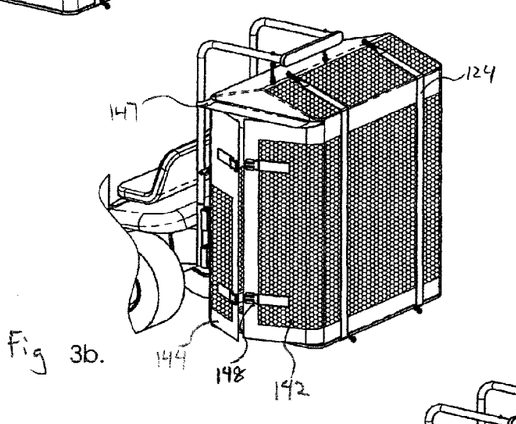
Figure 3C:
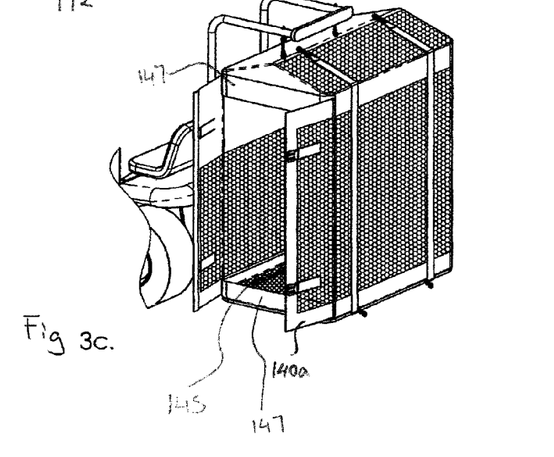

FIGS. 3A-3C depict a sequence for opening the vertical side doors 140 of the leaf collection apparatus 100. The leaf collection apparatus 100 can be suspended via the frame couples 210 from the cage suspension frame 200, which is mounted on a riding tractor (partially shown). The vertical side doors 140 open outwardly from the leaf collection apparatus 100, as shown in FIG. 3B. Each of the two vertical doors 140 preferably is formed with a collapsible mesh portion 142 reinforced with removable rigid to semi-rigid portions/slats 144 along the top, bottom and center edges of the side doors 140. The vertical doors 140 can be secured with the fasteners 148. The leaf collection apparatus 100 further includes two semi-rigid flaps 147, each of which is provided across a top portion of the side opening 145.

Figure 4:
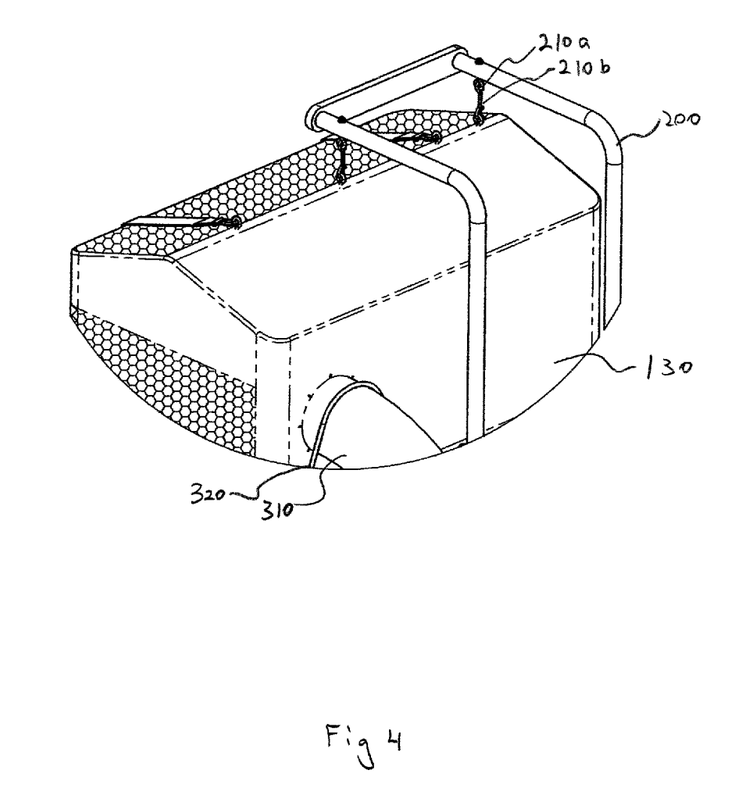
FIG. 4 depicts an embodiment of the leaf collection apparatus that is pivotably suspended from the suspension frame, and a set of fasteners for attaching the collection cage to the suspension frame.

FIG. 4 depicts an enlarged view of the suspension frame couples 210a for pivotably coupling of the leaf collection apparatus 100 to the cage suspension frame 200. The leaf collection apparatus 100 preferably is suspended from the cage suspension frame 200 by two frame couples 210, although additional frame couples 210 can be provided depending on the size of the leaf collection apparatus 100. Each of the frame couples 210 can include two coupling anchors, one of which is provided on the top ridge of the rigid top portion 126 and the other on an end portion of the cage suspension frame 200. Each of the frame couples 210 can include a double-ended latch hook 210b that connects the two coupling anchors 210a in order to suspend the leaf collection apparatus from the cage suspension frame 200. Eye hooks are mounted in the spine of the collection cage to serve as a means to attach the drop door straps when door is in secured or closed position.

FIG. 4 also depicts a portion of the leaf conduit 300, including a fastener 320 and a feed tube 310, each of which is described in further detail below with respect to FIG. 5. In FIG. 4, the feed tube 310 has been inserted into a substantially circular opening 150a, as shown in greater detail in FIGS. 5A-5D.

FIGS. 5A-5D depict a sequence of a star-shaped insertion port 150 for coupling the feed tube 310 of the leaf conduit 300 from the riding tractor to the leaf collection apparatus 100. The leaf conduit 300 includes a first substantially tubular portion 310a (as shown, this portion 310a incorporates a sharp turn or bend) that is to be inserted into the leaf collection apparatus 100. The leaf conduit 300 further includes a second substantially tubular portion 310b, which may incorporate a more gradual turn, and a third substantially tubular portion 310c, which can generally be straight. The shapes and configurations of the respective portions of the feed tube 310 are provided for descriptive purposes only, and are not intended to limit any shapes and/or configurations of the feed tube 310.

Figures 5A, 5B, 5C, 5D:
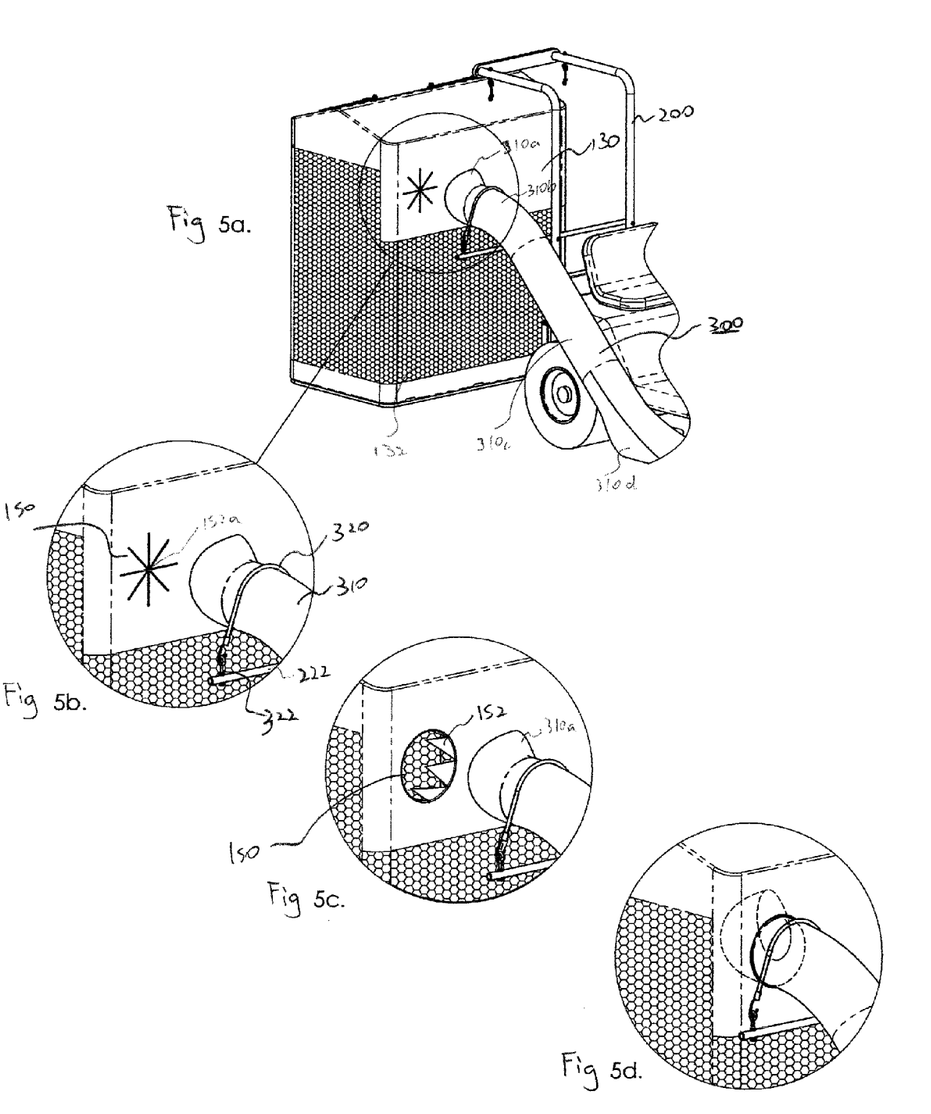
FIGS. 5A to 5D depict a sequence of features to accommodate the coupling of a feed tube from the riding tractor to a star-shaped insertion port of the leaf collection apparatus.

FIG. 5B depicts the first substantially tubular portion 310a prior to being inserted into the leaf collection apparatus 100. As shown, the star-shaped insertion port 150 is formed on the substantially impermeable top-side portion 130 of the leaf collection apparatus 100. The top-side portion 130 joins with a collapsible mesh bottom-side portion 132 to form an operator-facing side portion of the leaf collection apparatus 100. The insertion port 150 can be formed by cutting triangular leaves 152 radially from a single point 152a on the top-side portion 130. The leaves 152 remain attached to the top-side portion 130 radially about the point 152a and form a substantially circular opening 150a. Also depicted in FIGS. 5A-5D, is a conduit fastening portion 222 provided on the cage suspension frame 200. The conduit fastening portion 222 provides structural support for the gradually-turned portion 310b, which is to be rested upon the conduit fastening portion 222 and secured with a fastener 320.

Figure 6A:
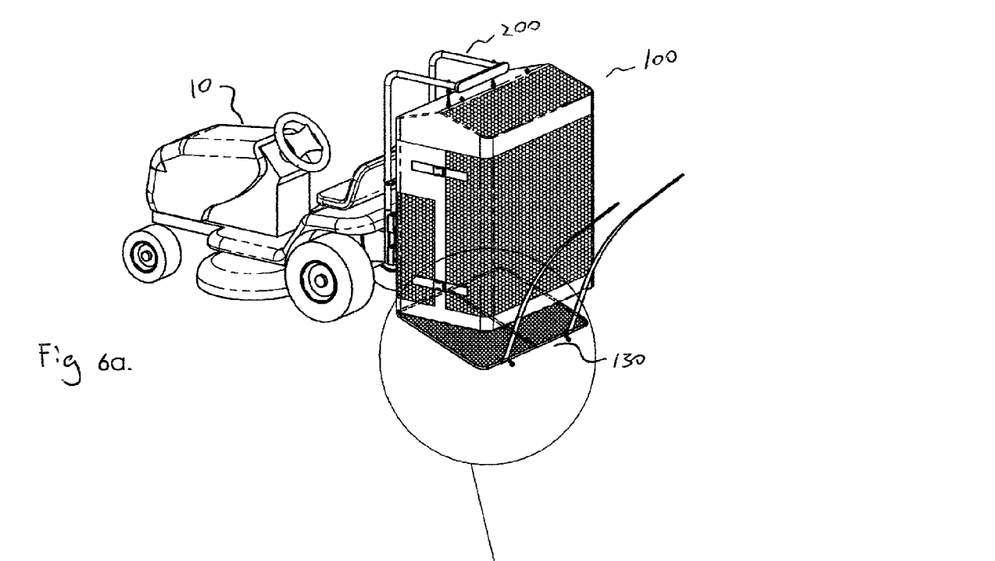
FIG. 6A depicts the leaf collection apparatus of FIGS. 1A-1C with a partially opened drop door.
Figure 6B:
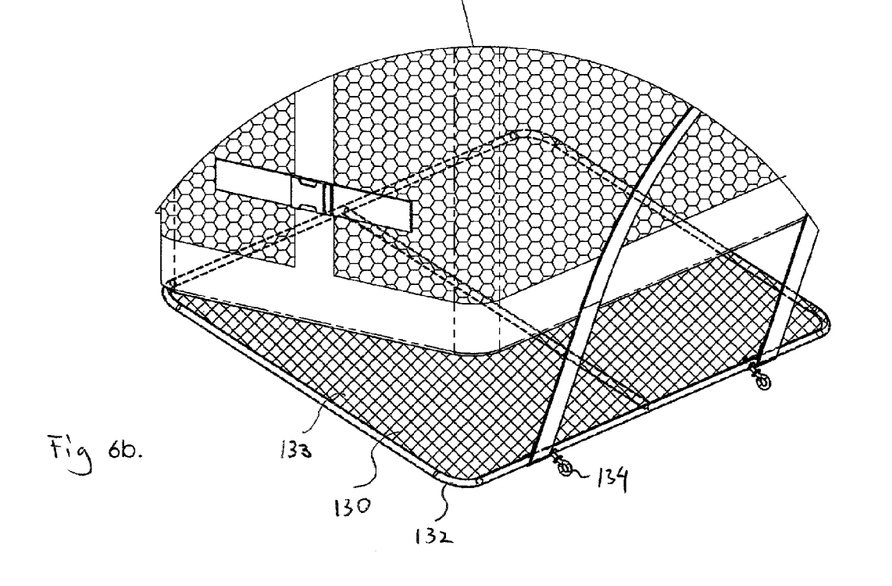
FIG. 6B depicts an enlarged view of the drop door of FIG. 6A.

FIG. 6A depicts the leaf collection apparatus 100 coupled to a riding tractor with a partially opened drop door. FIG. 6B depicts an enlarged view of the drop door 130 being opened by releasing the straps from the top of the leaf collection apparatus. The drop door 130 is preferably formed with a rigid frame 132, which is disposed around a rigid mesh 133. The rigid frame of the drop door 130 is configured to support the weight of the debris to be collected in the leaf collection apparatus 100 during operation of the riding tractor. The drop door 130 also is provided with a fastener anchor 134, which may be coupled with the fastener 124b for securing a collapsed leaf collection apparatus 100, by wrapping the fastener 124 around the top of the rigid top portion of the leaf collection apparatus 100 (as shown in FIG. 2A).

Figure 7A:
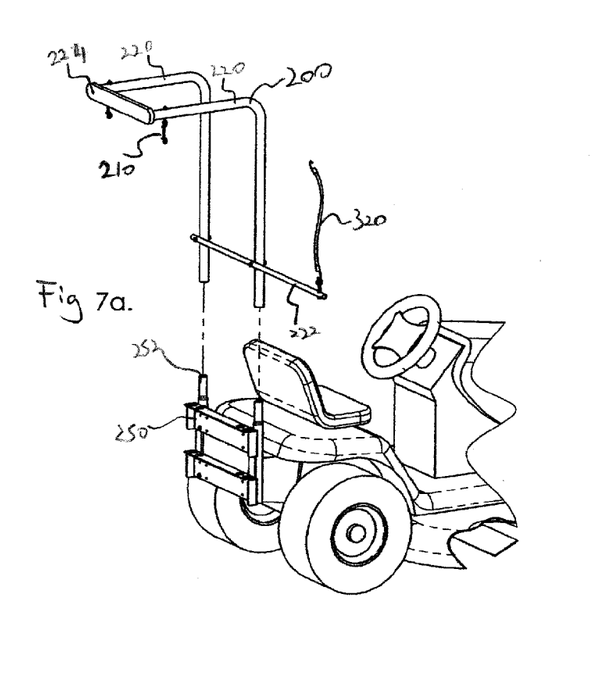
FIG. 7A depicts the cage suspension frame being lowered onto a mounting frame of the leaf collection apparatus.
Figure 7B:
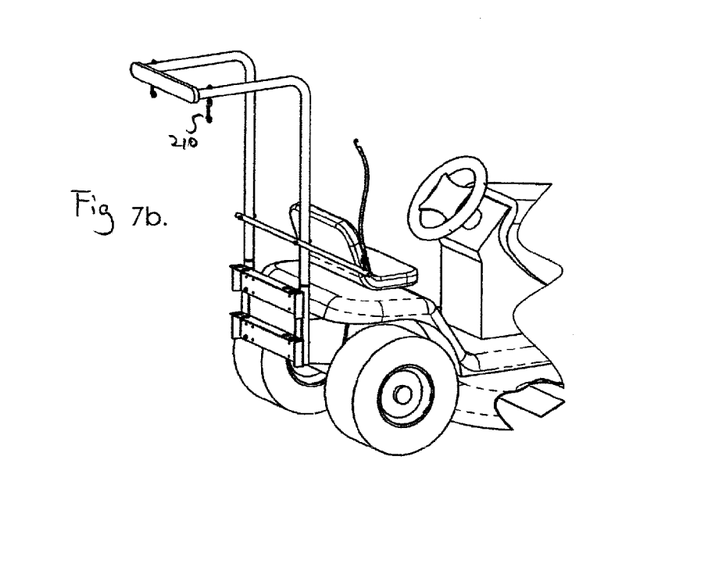
FIG. 7B depicts the cage suspension frame fully inserted into the mounting frame of the leaf collection apparatus.

FIG. 7A depicts the cage suspension frame 200 in the process of being lowered onto the mounting base 250. FIG. 7B depicts the cage suspension frame 200 fully lowered onto the mounting base 250. As shown, the cage suspension frame 200 includes two arms 220 fixed by a horizontal support/safety bar 224 (soft rounded edges of bar prevent potential injury if accidentally bumped into) and a conduit fastening/support bar 222. Safety bar 224 and support bar 222 provide dimensional stability to the cage suspension frame, forming a rigid frame, upon which the leaf collection apparatus 100 may be suspended. Further, the lower portions of the arms 220 are to be fitted over the tapered top portions 252a of the mounting tubes 252 on the mounting base 250 allowing for ease of removal and free up the lawn tractor for other uses.

Figure 8A:
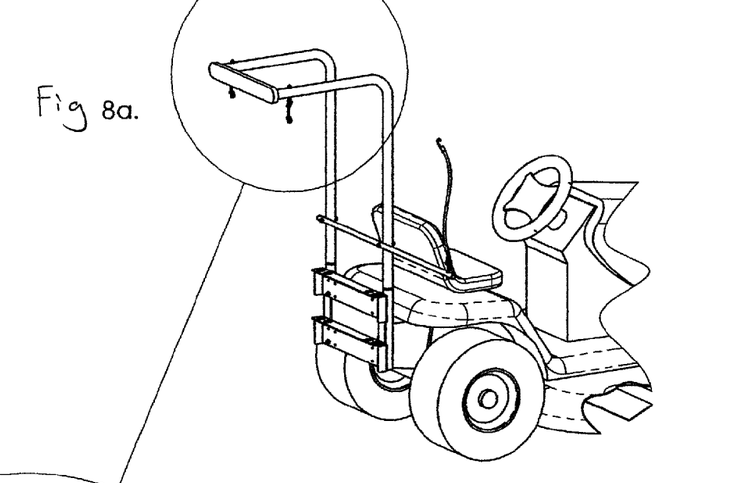
FIGS. 8A-8B depict the cage suspension frame assembled onto the riding tractor, and an enlarged partial view of the cage suspension frame and safety/stabilizing bar.
Figure 8B:
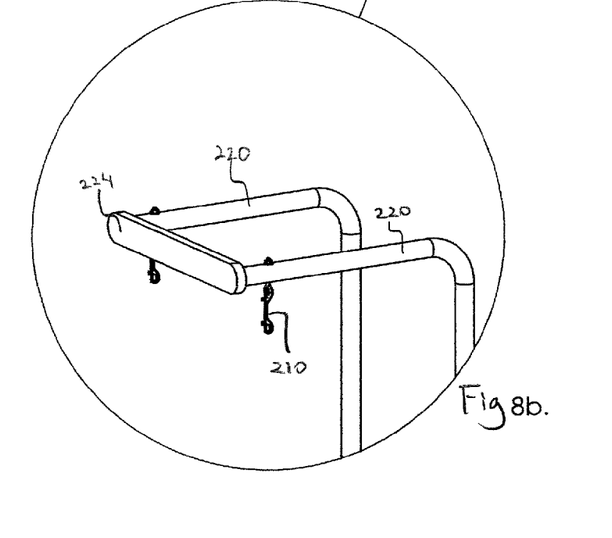

As shown in FIGS. 8A-8B, the two frame couples 210 are provided to pivotably suspend a leaf collection apparatus from the cage suspension frame. As described herein, the leaf collection apparatus preferably is pivotably suspended from the cage suspension frame 200. This arrangement permits an operator to lift the leaf collection apparatus from its rigid bottom portion and pivot about the frame couples 210 in order to empty the contents of the leaf collection apparatus through the side doors 140. As a result, it is possible to reduce the amount of effort required to empty the contents of the leaf collection apparatus, at least because the cage suspension frame 200 bears substantially all of the weight of the leaf collection apparatus.

Figure 9A:
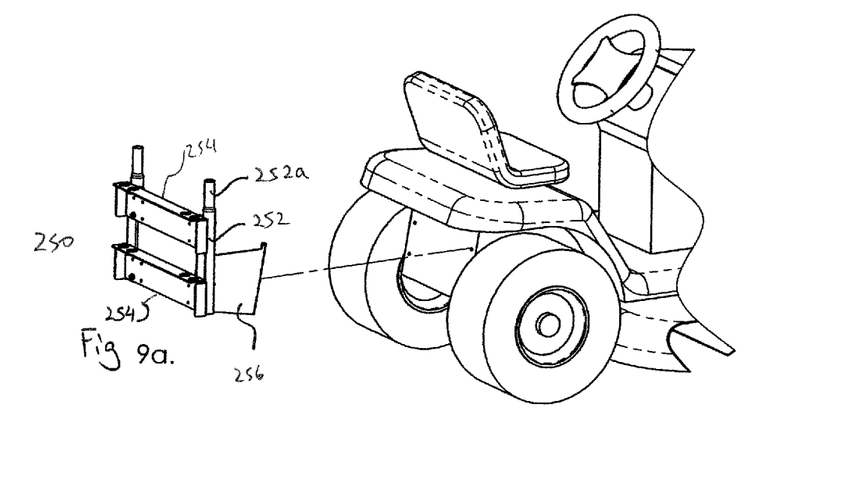
FIGS. 9A-9B depict the mounting frame of the leaf collection apparatus aligned to be assembled onto the riding tractor, and the mounting frame secured on the riding tractor.
Figure 9B:
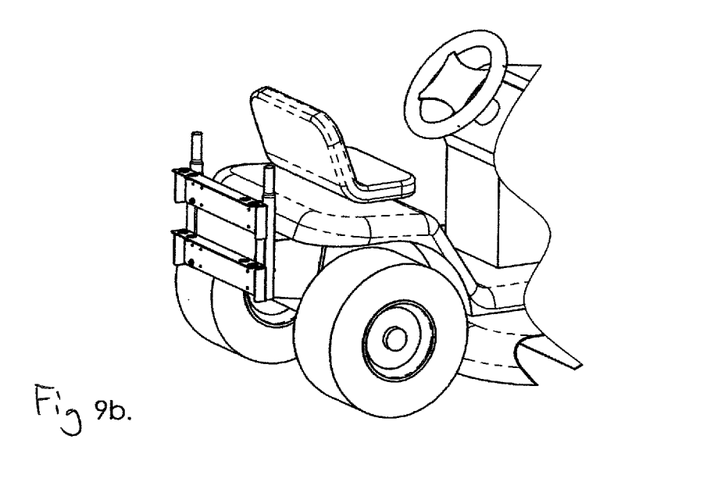

FIG. 9A depicts a mounting frame aligned to be assembled onto the riding tractor. As shown, the mounting base 250 comprises two mounting tubes 252, each of which further includes a tapered upper portion 252a. The tapered upper portions 252a can be slidably inserted into and out of the lower portion of the arms of the cage suspension frame. The mounting tubes 252 are fixed into a rigid frame with two horizontal plates 254. The mounting base further includes two adaptor plates 256, each of which is attached one side of the lower portion of the rigid frame. The adaptor plates are provided with mounting holes that align with the standardized mounting holes on the back of the riding mower.

Figure 10A:
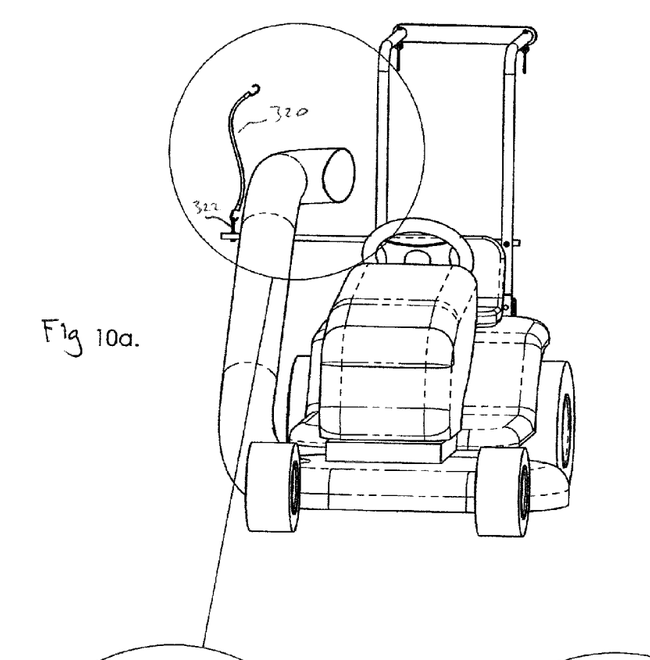
FIGS. 10A-10C depict various views of a feed conduit fastener for securing a feed conduit, which can be connected to the leaf collection apparatus.
Figure 10B:
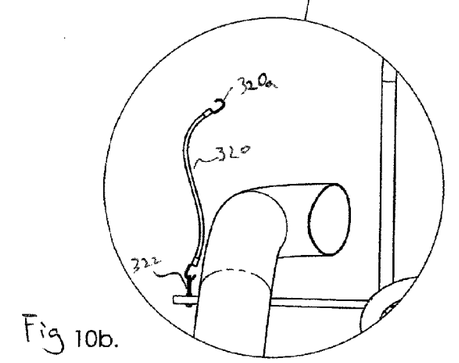
Figure 10C:
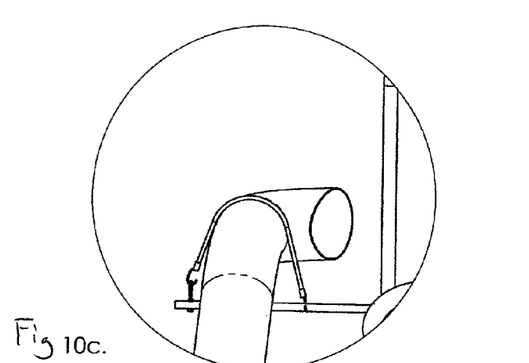

FIG. 10A depicts a feed conduit fastener for securing a feed conduit. FIGS. 10B and 10C depict enlarged views of the fastener. As shown, the cage suspension frame 200 includes a conduit fastening/support bar 222, on top of which the debris feeding conduit is removably supported. Further, a conduit fastener 320 is preferably provided to secure the feed conduit to the conduit fastening/support bar 222. The conduit fastener 320 preferably includes an elastic cord of a predetermined length and a hook 320a on each end of the cord. The conduit fastener 320 preferably hook into a fastening anchor 322 on one end and the conduit fastening/support bar 222 itself on another end to secure the feed conduit in place.

Figure 11A:
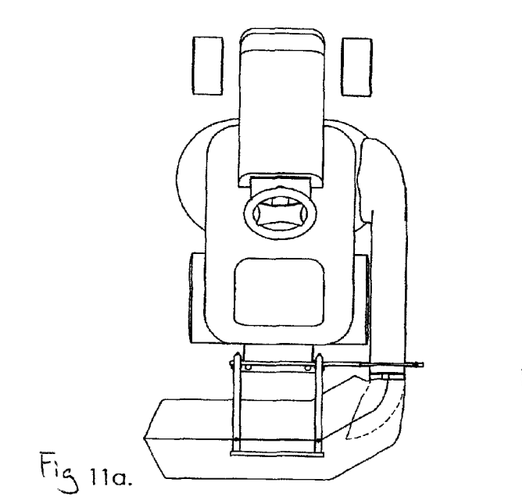
FIGS. 11A-11D depict various views of a leaf collection apparatus according to a second embodiment of the subject invention, which incorporates a vented disposable biodegradable bag in place of the collection cage, the leaf collection apparatus being assembled onto a riding tractor.
Figure 11B:
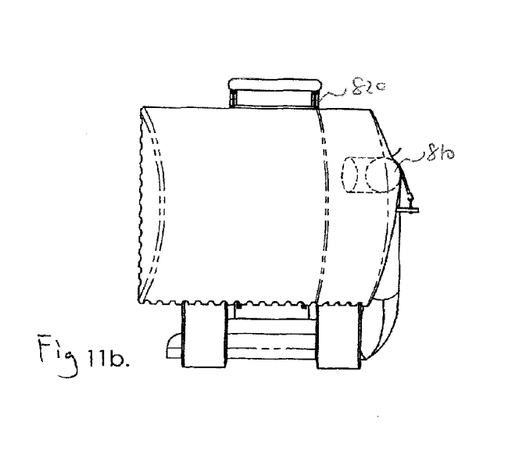
Figure 11C:
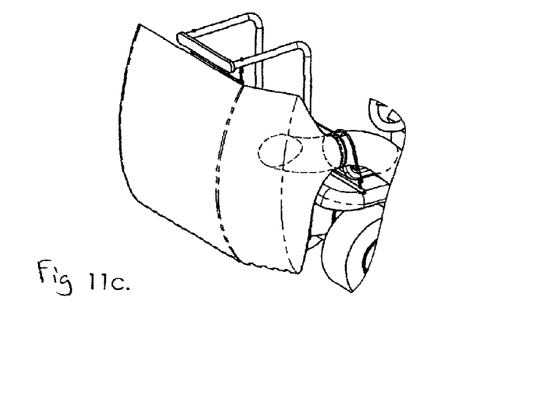
Figure 11D:
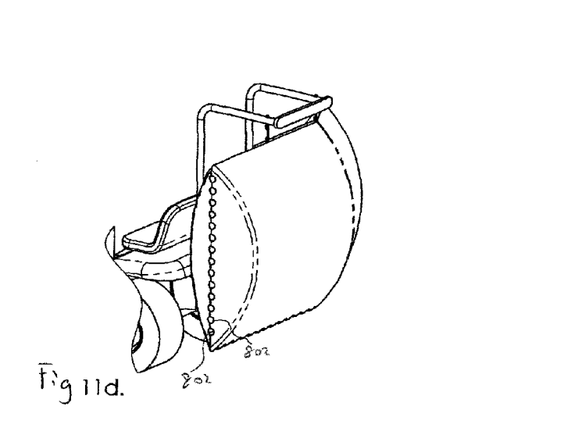

FIG. 11A depicts a top view of a leaf collection apparatus 800, according to a second embodiment of the subject invention, assembled onto a riding tractor. The leaf collection apparatus 800 is preferably formed with a single polyethylene membrane and comprises a plurality of openings 802 and a conduit insertion opening 810. The leaf collection apparatus 800 is also formed with a rigid tab 820 to couple with the previous described frame couples 210.

Figure 12:
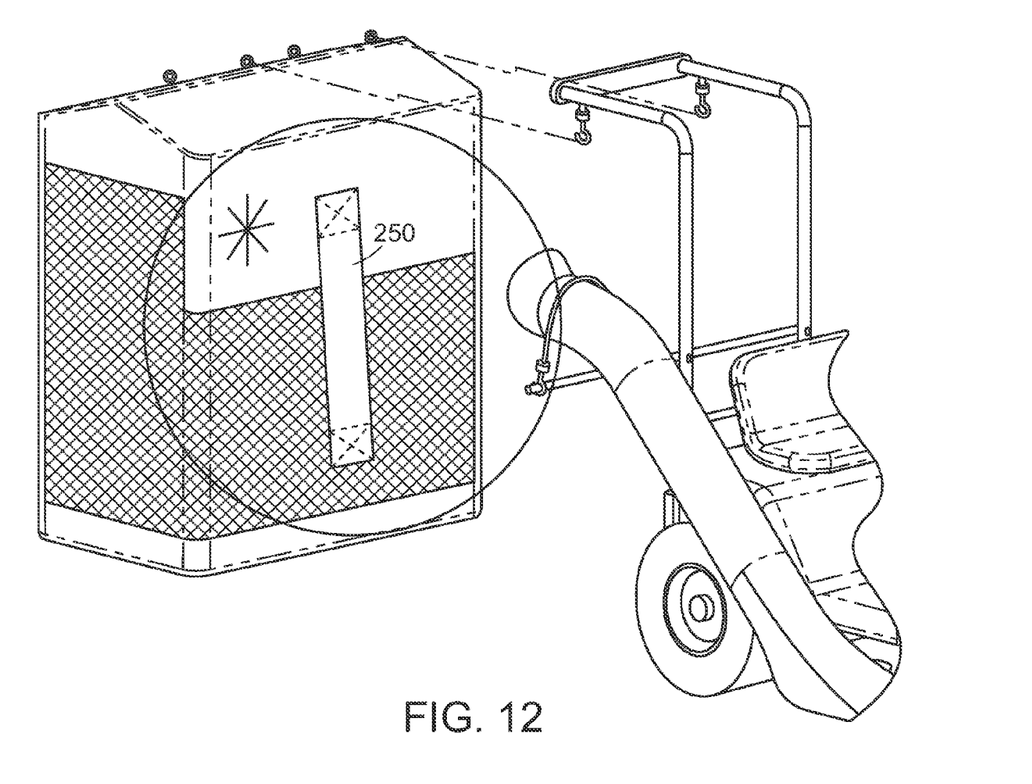
FIG. 12 depicts a leaf collection apparatus according to another embodiment of the subject invention in which an optional retention strap is provided.

According to another embodiment, as shown in FIG. 12, a retention strap 250 is provided to secure the leaf collection cage to the conduit fastening/support bar 222. The retention strap 250 can prevent the leaf collection cage from swaying sway from the feeding tube when the mower travels up an inclined surface. The retention strap 250 preferably allows the leaf collection cage to move up and down, which should not interfere with the intended movements of the leaf collection cage when it is lifted or pivoted. The retention strap preferably is made of the same material as the dust cover or other suitable material. The retention strap may be sewn or attached to the leaf collection by an adhesive. The length of the suspension strap may range from about 10 inches to 20 inches in length, and from about 2 inches to 8 inches in width. The operator may slide the fastener/support bar 222 between the retention strap and the leaf collection cage prior to attaching the leaf collection apparatus.

Incorporation By Reference

The entire contents of all patents, published patent applications, and other references cited herein are hereby expressly incorporated herein in their entireties by reference.

What is claimed is:

1. A yard waste collection system for connection with a tractor, the system comprising:
   a collection apparatus including a rigid internal frame, a top portion being a combination of at least a first panel portion that is substantially impermeable to dust particles and at least a second panel portion made of a flexible mesh material comprising nylon, the top portion being formed with at least two coupling anchors, a plurality of collapsible side portions made of the flexible mesh material comprising nylon and including at least one substantially impermeable panel portion, and at least a rigid bottom portion, the rigid bottom portion having a drop door that opens and closes relative to the rigid internal frame to allow access to an interior space of the collection apparatus, wherein the top portion and the collapsible side portions collapse and fold against the rigid bottom portion to produce a folded state in which the collection apparatus occupies a reduced space;
   a cage suspension frame having at least two frame couples and being operably connected to the tractor, the collection apparatus being pivotably suspended from the cage suspension frame by the at least two coupling anchors that are connected to the at least two frame couples, respectively; and
   a conduit for allowing passage of yard waste ejected from the tractor to the interior space of the collection apparatus.

2. The yard waste collection system of claim 1, wherein the drop door covers substantially an entire surface of the rigid bottom portion.

3. The yard waste collection system of claim 1, wherein the frame couples are spaced apart along the cage suspension frame for pivotably suspending the collection apparatus from the cage suspension frame.

4. The yard waste collection system of claim 3, further comprising a mounting base operably connected with the tractor.

5. The yard waste collection system of claim 4, wherein the cage suspension frame is operably and removably connected to the mounting base.

6. The yard waste collection system of claim 1, further comprising a fastener for maintaining the drop door in a closed state, the fastener comprising first and second straps each of which comprises:
   a first end attached to the drop door; and
   a second end removably attached to the top portion of the collection apparatus.

7. The yard waste collection system of claim 6, wherein the drop door further comprises anchor portions such that the fastener is wrapped around the top portion and removably attached to the anchor portions, when the side portions are collapsed.

8. The yard waste collection system of claim 1, further comprising an insertion port for removably coupling an opening of the conduit to the interior space of the collection apparatus.

9. The yard waste collection system of claim 1, wherein the plurality of collapsible side portions further comprises:
   a first substantially permeable side portion including a door; and
   second and third substantially permeable side portions.

10. The yard waste collection system of claim 9, wherein the substantially permeable portions are made with a flexible mesh material.

11. A method of adapting a waste collection system to a tractor, the method comprising:

providing a mounting frame to an existing mounting portion of the tractor, the mounting frame being connected to a cage suspension frame having at least two frame couples;

pivotably suspending a collection apparatus from the cage suspension frame, the collection apparatus including a rigid internal frame, a top portion being a combination of at least a first panel portion that is substantially impermeable to dust particles and at least a second panel portion made of a flexible mesh material comprising nylon, the top portion being formed with at least two coupling anchors, a plurality of collapsible side portions made of the flexible mesh material comprising nylon and including at least one substantially impermeable panel portion, and at least a rigid bottom portion, the rigid bottom portion having a drop door that opens and closes relative to the rigid internal frame to allow access to an interior space of the collection apparatus, wherein the collection apparatus is pivotably suspended from the cage suspension frame by the at least two coupling anchors that are connected to the at least two frame couples, respectively;

providing a conduit for allowing passage of yard waste ejected from the tractor to the interior space of the collection apparatus; and collapsing and folding the top portion and the collapsible side portions against the rigid bottom portion to produce a folded state in which the collection apparatus occupies a reduced space.

12. The method of claim 11, wherein the drop door covers substantially an entire surface of the rigid bottom portion.

13. The method of claim 11, wherein the step of providing a mounting frame comprises:

providing a mounting base operably connected with the tractor.

14. The method of claim 13, wherein the mounting frame is operably and removably connected to the mounting base.

15. The method of claim 14, wherein the frame couples are spaced apart along the cage suspension frame for pivotably suspending the collection apparatus from the cage suspension frame.

16. The method of claim 11, further comprising:

providing a fastener for maintaining the drop door in a closed state, the fastener comprising first and second straps each of which comprises:

a first end attached to the drop door; and a second end removably attached to the top portion of the collection apparatus.

17. The method of claim 16, wherein the drop door further comprises anchor portions such that the fastener is wrapped around the top portion and removably attached to the anchor portions, when the side portions are collapsed.

18. The method of claim 11, further comprising:

providing an insertion port for removably coupling an opening of the conduit to the interior space of the collection apparatus.

19. The method of claim 18, wherein the plurality of collapsible side portions further comprises:

a first substantially permeable side portion including a door with removable slats; and second and third substantially permeable side portions.

20. A collector for collecting debris from a grass mower, comprising:

a rigid internal frame;

a top portion being a combination of at least a first panel portion that is substantially impermeable to dust particles and at least a second panel portion made of a flexible mesh material comprising nylon, the top portion being formed with at least two coupling anchors;

a rigid bottom portion; and collapsible side portions comprising:

a first substantially permeable side portion including a door;

second and third substantially permeable side portions made of the flexible mesh material comprising nylon; and at least one substantially impermeable panel portion; and a conduit for allowing passage of ejected debris from an ejection opening of the grass mower to an interior space of the collector, wherein the top portion and the collapsible side portions collapse and fold against the rigid bottom portion to produce a folded state in which the collector occupies a reduced space, and the collector is pivotably suspended from a cage suspension frame of the grass mower by the at least two coupling anchors that are connected to at least two frame couples, respectively, of the cage suspension frame.

* * * * *